(12) United States Patent
Bradbury et al.

(10) Patent No.: US 11,529,689 B2
(45) Date of Patent: Dec. 20, 2022

(54) METHODS AND APPARATUS FOR FORMING AN APERTURE IN A COMPOSITE COMPONENT

(71) Applicant: General Electric Company, Schenectady, NY (US)

(72) Inventors: George Douglas Bradbury, Loveland, OH (US); Michael James Anderson, Aurora, IN (US)

(73) Assignee: General Electric Company, Schenectady, NY (US)

( * ) Notice: Subject to any disclaimer, the term of this patent is extended or adjusted under 35 U.S.C. 154(b) by 108 days.

(21) Appl. No.: 16/739,225

(22) Filed: Jan. 10, 2020

(65) Prior Publication Data

US 2021/0213541 A1 Jul. 15, 2021

(51) Int. Cl.
*B23B 35/00* (2006.01)
*B23B 51/02* (2006.01)

(52) U.S. Cl.
CPC .............. *B23B 35/00* (2013.01); *B23B 51/02* (2013.01)

(58) Field of Classification Search
CPC . B23B 35/00; B23B 2215/04; B23B 2215/76; B23B 2220/32; B23B 2226/18
See application file for complete search history.

(56) References Cited

U.S. PATENT DOCUMENTS

| | | | |
|---|---|---|---|
| 2,996,061 A * | 8/1961 | Miller | B28D 1/041 408/59 |
| 4,483,108 A * | 11/1984 | Howard | B24D 7/18 408/1 BD |
| 4,800,686 A | 1/1989 | Hirabayashi et al. | |
| 5,137,098 A | 8/1992 | Raffaelli | |
| 6,176,676 B1 | 1/2001 | Ikeda et al. | |
| 6,902,360 B2 | 6/2005 | Meece et al. | |
| 7,237,989 B2 | 7/2007 | Glaesser | |
| 8,905,713 B2 | 12/2014 | Bunker et al. | |
| 9,969,009 B2 | 5/2018 | Luketic et al. | |
| 2018/0311748 A1 | 11/2018 | Novovic et al. | |
| 2018/0369925 A1 | 12/2018 | Novovic et al. | |

(Continued)

FOREIGN PATENT DOCUMENTS

| | | |
|---|---|---|
| CN | 104526026 A | 4/2015 |
| CN | 108161070 A | 6/2018 |
| CN | 207629258 | 7/2018 |

(Continued)

*Primary Examiner* — Alan Snyder
(74) *Attorney, Agent, or Firm* — Dority & Manning, P.A.

(57) ABSTRACT

Methods and apparatus for forming an aperture in a composite component are provided. For example, a method for forming an aperture in a ceramic matrix composite (CMC) component comprises, based on a final dimension of the aperture, selecting a tool having a tool size and a cutting surface; selecting an angle at which to cut the component with the tool; cutting a back surface of the component with the tool, the cutting surface positioned at the angle; repositioning the tool relative to the component; and cutting the aperture through to its final dimension. The tool may be a core drill with a diameter within a range of 60% to 90% of the aperture final dimension. The angle may be within a range of 10° to 60° with respect to the back surface. The aperture may be cut through to its final dimension from a front surface of the component.

19 Claims, 5 Drawing Sheets

(56) References Cited

U.S. PATENT DOCUMENTS

2019/0143431 A1  5/2019  Luo et al.

FOREIGN PATENT DOCUMENTS

| EP | 3015204 A1 | * | 5/2016 | ............ | B23B 35/00 |
| JP | S51161456 U | | 12/1976 | | |
| JP | H05269669 A | | 10/1993 | | |
| JP | H0976228 A | | 3/1997 | | |
| JP | 2007076183 A | | 3/2007 | | |

* cited by examiner

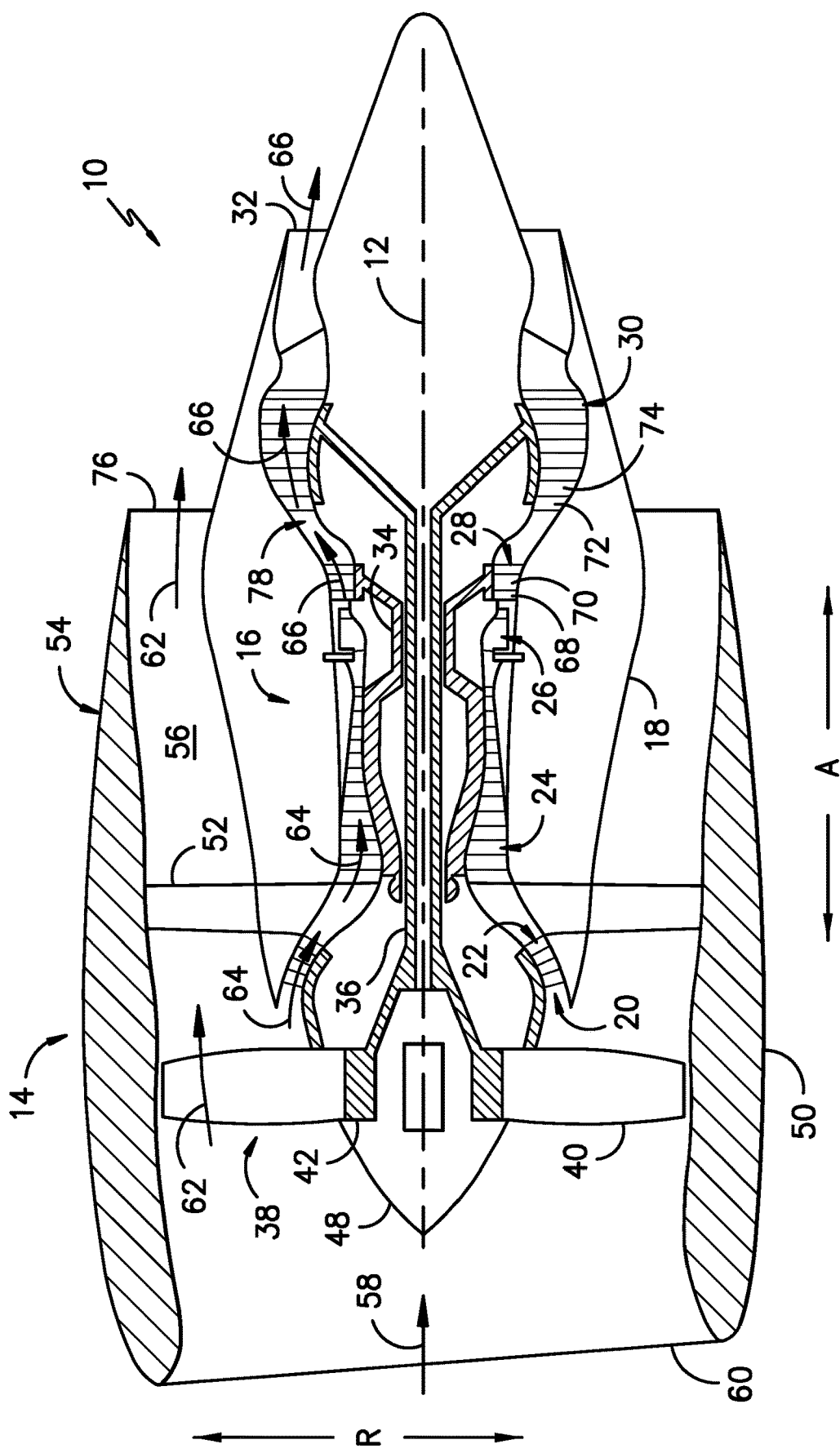
FIG. -1-

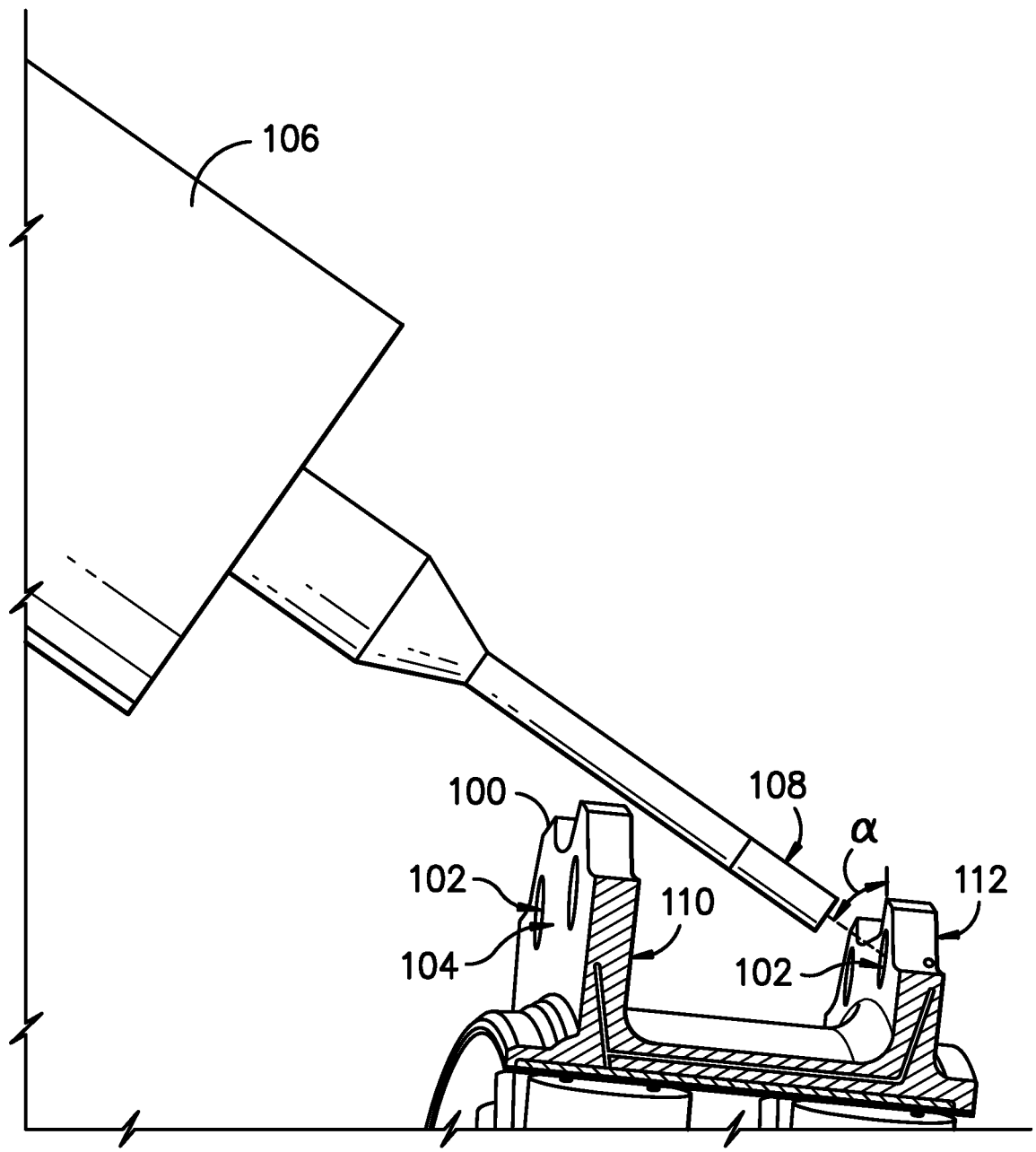
FIG. -2-

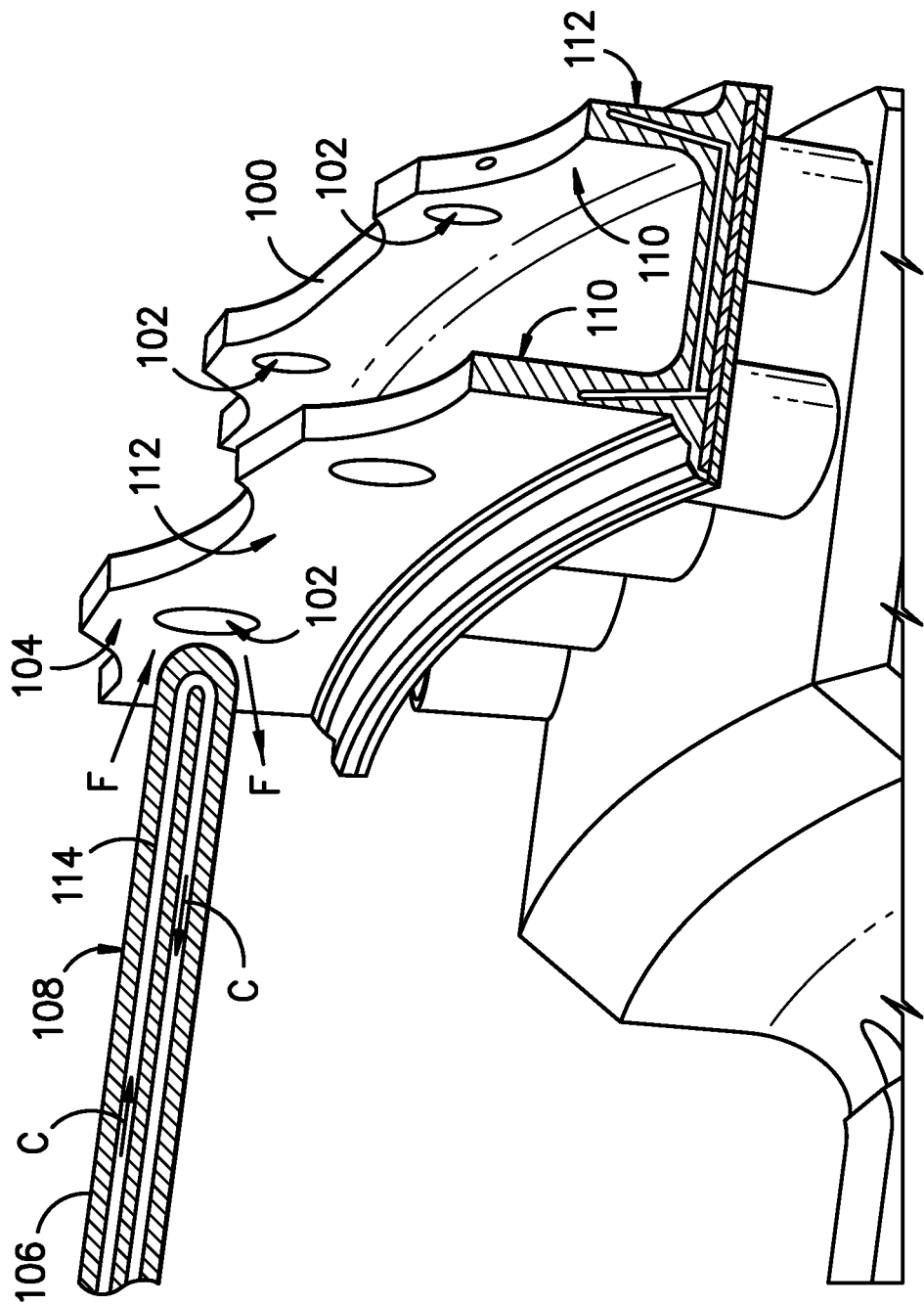
FIG. -3-

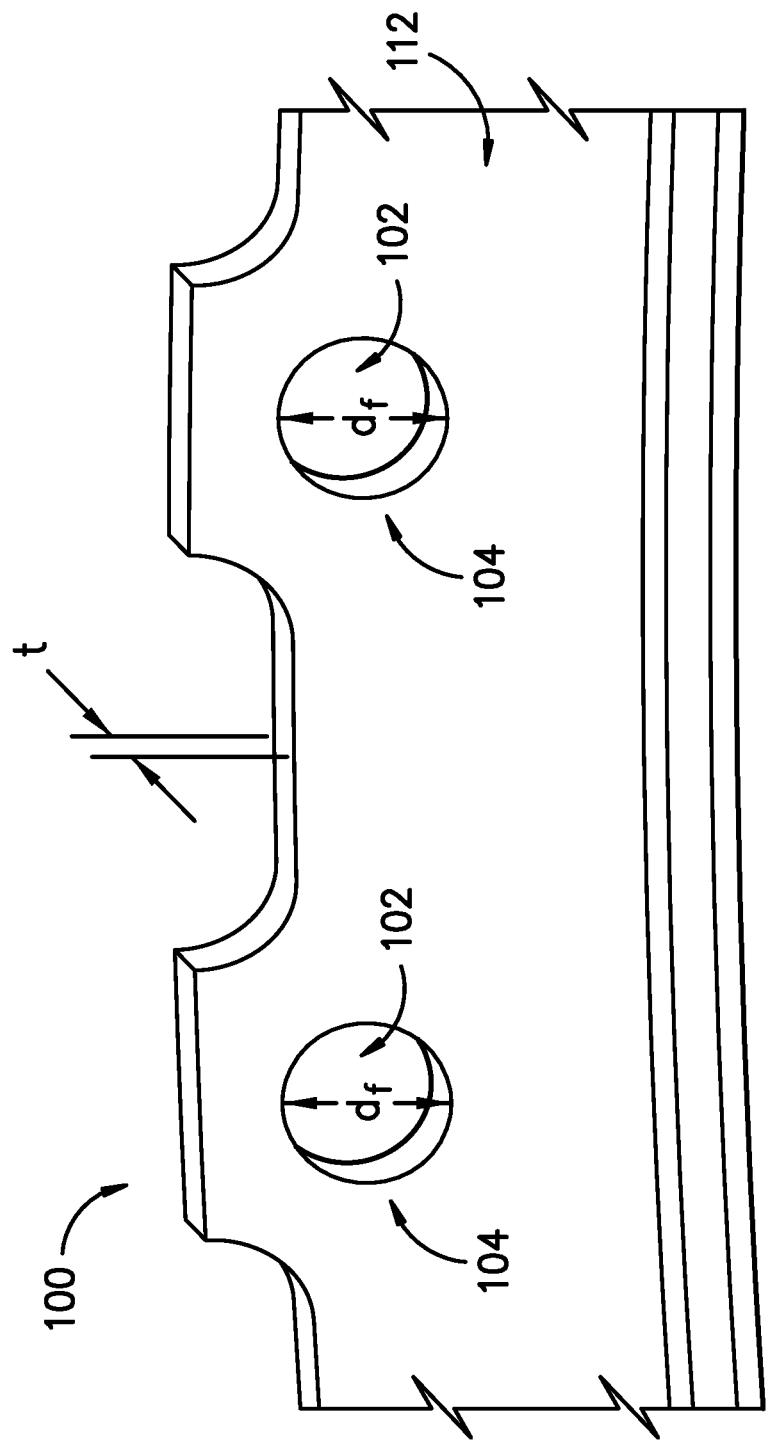
FIG. -4-

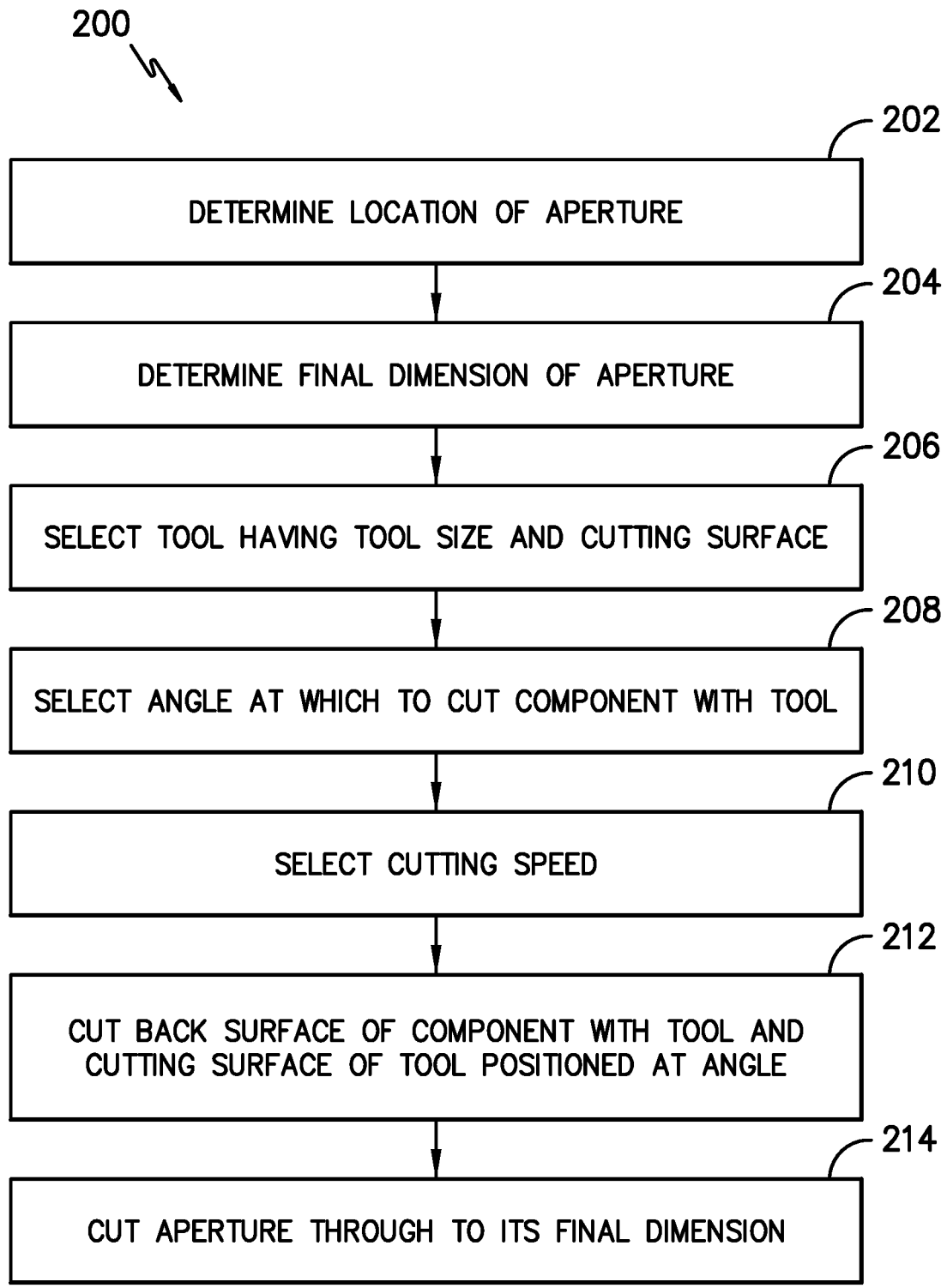
FIG. -5-

METHODS AND APPARATUS FOR FORMING AN APERTURE IN A COMPOSITE COMPONENT

FIELD

The present subject matter relates generally to composite components, more particularly, to ceramic matrix composite components and, most particularly, to methods and apparatus for forming an aperture in a ceramic matrix composite component.

BACKGROUND

More commonly, non-traditional high temperature composite materials, such as ceramic matrix composite (CMC) materials, are being used in applications such as gas turbine engines. Components fabricated from such materials have a higher temperature capability compared with typical components, e.g., metal components, which may allow improved component performance and/or increased engine temperatures. Composite components may provide other advantages as well, such as an improved strength to weight ratio.

In some applications, an aperture or hole is needed in a composite component. Conventional cutting, drilling, grinding, or other means for machining an aperture or hole in a CMC component routinely result in 30% to 40% of the machined components having a defect. While laser machining can reduce the amount of defective components, i.e., can increase yield, laser machining is not feasible for machining every aperture or hole. For instance, some components may be too large to fit with the laser tooling, i.e., the component or part cannot be positioned in the laser tooling to machine the aperture in the desired location. As another example, laser machining is not feasible where the laser could harm or destroy another portion of the component or part, e.g., where an aperture is needed in a flange or the like and the laser could harm or destroy a portion of the component or part beyond the flange. Further, in some applications, the laser cannot be aligned with the component or part to machine the aperture or hole, e.g., a laser often cannot be used to machine blind holes because the laser cannot be aligned with the component to machine the hole.

Accordingly, improvements to methods, processes, and apparatus for forming apertures in composite components that help overcome these issues would be useful.

BRIEF DESCRIPTION

Aspects and advantages of the invention will be set forth in part in the following description, or may be obvious from the description, or may be learned through practice of the invention.

In one exemplary embodiment of the present subject matter, a method for forming an aperture in a ceramic matrix composite (CMC) component is provided. The method comprises, based on a final dimension of the aperture, selecting a tool having a tool size and a cutting surface; selecting an angle at which to cut the component with the tool; cutting a back surface of the component with the tool, the cutting surface of the tool positioned at the angle; repositioning the tool relative to the component; and cutting the aperture through to its final dimension.

In another exemplary embodiment of the present subject matter, a method for forming an aperture in a ceramic matrix composite (CMC) component is provided. The aperture extends through the component between a front surface and an opposing back surface at a pre-determined location and a pre-determined final dimension. The method comprises selecting a tool having a tool size and a cutting surface; selecting an angle less than 90° at which to cut the back surface of the component with the tool, wherein the component has a geometry that prevents the tool from being aligned at a 90° angle to the back surface; cutting the back surface of the component with the tool to a depth less than a thickness of the component at the pre-determined location of the aperture, the cutting surface of the tool positioned at the angle; and cutting the aperture through to the pre-determined final dimension from the front surface.

In still another exemplary embodiment of the present subject matter, a method for forming an aperture in a ceramic matrix composite (CMC) component is provided. The method comprises, based on a final dimension of the aperture, selecting a core drill having a cutting diameter and a cutting surface; selecting an angle at which to cut the component with the core drill; cutting a back surface of the component with the core drill, the cutting surface of the core drill positioned at the angle; and cutting the aperture through to its final dimension from a front surface of the component, the front surface opposite the back surface, the cutting surface of the core drill positioned normal to the front surface.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a perspective, partial cross-section view of a tool approaching a back surface of a composite component to begin forming an aperture in the composite component, according to an exemplary embodiment of the present subject matter.

FIG. 3 provides a perspective, partial cross-section view of the tool of FIG. 2 approaching a front surface of the composite component to complete forming the aperture in the composite component, according to an exemplary embodiment of the present subject matter.

FIG. 4 provides a front view of a portion of the composite component of FIG. 2, illustrating two apertures formed in the composite component, according to an exemplary embodiment of the present subject matter.

FIG. 5 provides a flow chart illustrating a method for forming an aperture in a composite component, according to an exemplary embodiment of the present subject matter.

DETAILED DESCRIPTION

Reference will now be made in detail to present embodiments of the present subject matter, one or more examples of which are illustrated in the accompanying drawings. The detailed description uses numerical and letter designations to refer to features in the drawings. Like or similar designations in the drawings and description have been used to refer to like or similar parts of the present subject matter.

The word "exemplary" is used herein to mean "serving as an example, instance, or illustration." Any implementation described herein as "exemplary" is not necessarily to be construed as preferred or advantageous over other implementations.

As used herein, the terms "first," "second," "third," etc. may be used interchangeably to distinguish one component from another and are not intended to signify location or importance of the individual components.

The terms "forward" and "aft" refer to relative positions within a gas turbine engine or vehicle and refer to the normal fluid flow path through the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a ceramic matrix composite (CMC) material, which has high temperature capability. Composite materials generally comprise a fibrous reinforcement material embedded in matrix material, e.g., a ceramic matrix material. The reinforcement material serves as a load-bearing constituent of the composite material, while the matrix of a composite material serves to bind the fibers together and act as the medium by which an externally applied stress is transmitted and distributed to the fibers.

Exemplary CMC materials may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYL-RAMIC®), alumina silicates (e.g., 3M's Nextel 440 and 480), and chopped whiskers and fibers (e.g., 3M's Nextel 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration with silicon, to arrive at a component formed of a CMC material having a desired chemical composition. In other embodiments, the CMC material may be formed as, e.g., a carbon fiber cloth rather than as a tape.

Turning to FIGS. 2-5, various methods for forming apertures in a CMC component are provided. In an exemplary embodiment, a method 200 for forming an aperture 102 in a CMC component 100 comprises determining a location 104 of the aperture 102 on the component 100, as shown at 202 in FIG. 5. More specifically, the location 104 is where the aperture 102 is formed on the component 100, e.g., by drilling or grinding as further described herein. As illustrated at 204, the method 200 also may include determining a final dimension $d_f$ of the aperture 102. The CMC component 100 may be any CMC component 100 requiring an aperture formed therein. The final dimension $d_f$ may be, e.g., a diameter as shown in FIG. 4. Next, as shown at 206, the method 200 includes selecting a tool 106 having a tool size and a cutting surface 108. More particularly, the final dimension $d_f$ of the aperture 102 may be used to select the tool 106, e.g., the tool size may be an outer diameter of the cutting surface 108.

In exemplary embodiments, the tool size of the selected tool 106 is within a range of 60% to 90% of the final dimension $d_f$ of the aperture 102. In other embodiments, the tool size of the selected tool 106 is within a range of 65% to 80% of the final dimension $d_f$ of the aperture 102. More particularly, the tool size of the selected tool 106 may be within a range of 70% to 75% of the final dimension $d_f$ of the aperture 102. For instance, the tool 106 may have a tool size that is one mil to twenty mils (or 0.001" to 0.020") smaller than the final dimension $d_f$ of the aperture 102. As one example, the cutting surface 108 may have a cutting diameter that is 3 mils (or 0.003") smaller than the finished diameter (i.e., the final dimension $d_f$) of the aperture 102. As another example, the cutting surface 108 may have a size that is no more than 15 mils (or 0.015") smaller per side of the aperture 102 at its final dimension $d_f$.

As depicted at 208 in FIG. 5, the method 200 further may include selecting an angle α at which to cut the CMC component 100 with the tool 106. The method also may include selecting a cutting speed for the tool 106, as shown at 210 in FIG. 5. The cutting speed may be the speed at which the cutting surface 108 of the tool 106 operates to cut the component 100, and the cutting speed may be constrained by the tool 106. For example, it may be desirable to operate the tool 106 at a certain speed, e.g., to shorten manufacturing time, but a specific tool 106 may not be able to operate at the certain speed. In exemplary embodiments, the cutting speed is within a range of 400 surface feet per minute (SFM) to 1500 SFM. In some embodiments, the cutting speed is within a range of 900 SFM to 1100 SFM.

Although described and shown in a particular order in FIG. 5, it will be understood that the operations shown at 202 through 210 of method 200 need not be performed in the illustrated order. For instance, the location 104 of the aperture 102 need not be determined before the final dimension $d_f$ of the aperture 102 is determined. In some embodiments of the method 200, the final dimension $d_f$ of the aperture 102 may be determined before the aperture location 104 is determined. Further, one or both of the location 104 and final dimension df of the aperture 102 may be predetermined, such that the method 200 begins with selecting the tool 106 as shown at 206 in FIG. 5. As another example, the angle α need not be selected before the cutting speed is selected. Rather, in some embodiments of the method 200, the cutting speed of the tool 106 may be selected before selecting the angle α at which to cut the component 100 with the tool 106. The operations of the method 200 may be performed in other orders as well.

As shown at 212, after parameters such as the aperture size, tool size, tool angle, and cutting speed are determined or selected, the method 200 may comprise cutting a back surface 110 of the component 100 with the tool 106. More particularly, as shown in FIG. 2, the cutting surface 108 of the tool may be positioned at the angle α, and it will be appreciated that cutting the back surface 110 of the component 100 comprises cutting the back surface 110 at the location 104 of the aperture 102. That is, the back surface 110 is cut at the pre-determined aperture location 104 on the component 100. As illustrated in FIG. 2, the tool 106 may follow a path depicted by the dashed line to approach the component 100. Further, as previously described, the size of the tool 106 is selected such that the tool size dimension (e.g., a diameter of the cutting surface 108) is smaller than the final dimension $d_f$ of the aperture 102 (e.g., a final or finished diameter of the aperture 102). In some embodiments, the component stock remaining in the aperture 102 after cutting from the back surface 110 may be within a range of one mil to twenty mils (or 0.001" to 0.020").

The angle α may be measured with respect to the back surface 110 and may be non-normal to back surface 110, i.e., less than 90°. In some embodiments, the angle is within a range of 5° to 80° with respect to the back surface 110 of the component 100. In further embodiments, the angle is within a range of 10° to 60° with respect to the back surface 110 of the component 100. In yet other embodiments, the angle is within a range of 30° to 50° with respect to the back surface 110 of the component 100. The angle α for a particular component 100 may depend on the geometry of the component 100 at the aperture location 104 and the clearance allowed by the component geometry for the tool 106 to cut the back surface 110. Thus, the selected angle α may vary from one component 100 to another component 100 or from one location 104 for a first aperture 102 to another location 104 for a second aperture 102.

As shown at 214 in FIG. 5, the method 200 also may include cutting the aperture 102 through to its final dimension $d_f$. More specifically, when cutting the back surface 110 of the component 100 at the angle α, the tool 106 likely will not go completely through the component 100 to the front side 112 or at least not at the desired location 104 for the aperture 102. Thus, cutting the back surface 110 of the component 100 may comprise cutting the component 100 to a depth that is less than a thickness t of the component 100 at the location 104 of the aperture 102. The depth of the cut from the back surface 110 may be constrained by the tangency of the angle of the tool 106 to the component 100. Accordingly, cutting the aperture 102 through to its final dimension $d_f$ may comprise a second cutting step different from the first cutting step. The second cutting step may comprise repositioning the tool 106 relative to the component 100. For example, cutting the aperture 102 through to its final dimension $d_f$ may comprise repositioning the tool 106 for cutting the component 100 from a front surface 112, which is the surface opposite the back surface 110. It will be appreciated that, as shown in FIGS. 2-4, the component 100 may provide an open line of sight from the front surface 112 to the back surface 110. Further, the back surface 110 is the surface of the component 100 that has a constraining geometry, e.g., a tool 106 cannot be positioned normal to the back surface 110 to form the aperture 102. The front surface 112, however, may not constrain the position of the tool 106. For example, cutting the component 100 from the front surface 112 may comprise cutting the component 100 with the cutting surface 108 of the tool 106 positioned normal to the front surface 112, as shown in FIG. 3. Alternatively, cutting the aperture 102 through to its final dimension $d_f$ may comprise repositioning the tool 106 for cutting the component 100 from the back surface 110 with the cutting surface 108 of the tool 106 positioned and/or angled differently relative to the back surface 110 compared to its position during the first cutting step.

In some embodiments, the tool 106, e.g., the cutting surface 108 of the tool 106, may be cooled as the tool 106 cuts the component 100 to form the aperture 102. For instance, during one or both of the cutting operations shown at 212 and 214 in FIG. 5, the method 200 may comprise circulating a coolant C along a flow path 114 within the tool 106. At least a portion of the flow path 114 may be defined adjacent the cutting surface 108, e.g., such that the coolant C flows adjacent the cutting surface 108 to cool the cutting surface 108. Additionally or alternatively, during one or both of the cutting operations shown at 212 and 214 in FIG. 5, the method 200 may comprise flushing the aperture 102 with a fluid F while cutting. As an example, the fluid F may flow into and out of the aperture 102 as the tool 106 cuts the back surface 110 of the component 100. The fluid F may help remove debris, e.g., cut particles or fragments of the component 100, from the aperture 102 and/or may help cool the tool 106 as it cuts the component 100.

As described above, the cutting speed of the tool 106 may be selected before the back surface 110 is cut with the tool 106 as shown at 212 in FIG. 5, which is followed by cutting the aperture 102 through, e.g., from the front surface 112, as shown at 214. In some embodiments, a first cutting speed may be used to cut the back surface 110, and a second cutting speed different than the first cutting speed may be used to complete the cut through the component 100 to completely define the aperture 102. For example, the first cutting speed may be used when cutting the back surface 110, and the second cutting speed may be used when cutting the front surface 112. More particularly, a first tool 106 having a first tool size (e.g., a first diameter) may be used when cutting the back surface 110, and a second tool 106 having a second tool size (e.g., a second diameter) may be used when cutting the front surface 112. In one embodiment, the first tool 106 is smaller than the second tool 106, and the first cutting speed used when cutting the back surface 110 is faster than the second cutting speed used to complete the cut through the component 100. In other embodiments, the same cutting speed may be used for both cutting operations, e.g., for cutting the back surface 110 as well as the front surface 112. Further, the tool or machine capability and/or the materials capability may be limiting factors on the cutting speed. For instance, for a first tool 106 and a second tool 106 having different tool sizes and operated at the same cutting speed (e.g., in surface feet per minute), the tool having the smaller tool size will operate at a higher RPM (revolutions per minute). The capability of the tool 106 to operate at the higher RPM may be a limiting factor on the cutting speed, e.g., a slower cutting speed may need to be selected to lower the RPM of the tool 106 within a range that the tool can tolerate. As another example, the cutting speed may be limited by the capability of the material of the component 100. In some embodiments, the cutting speed may have a ceiling of 1500 SFM based on the material's capability to tolerate cutting or grinding at that speed without breaking, chipping, cracking, or otherwise degrading or developing a defect.

Any appropriate tool 106 may be used to cut, grind, drill, or otherwise form the aperture 102. In exemplary embodiments, the tool 106 is a core drill. In such embodiments, the cutting surface 108 may be a diamond impregnated cutting surface, and in still further embodiments, the core drill may be a diamond impregnated drill with coolant C circulating through a center of the drill. A core drill typically removes a cylinder of material; thus, where the tool 106 is a core drill, the tool 106 may remove a cylinder of CMC material at the location 104 on the component 100.

In embodiments in which the tool 106 is a core drill, the method 200 may comprise determining a location 104 of the aperture 102 and a final dimension $d_f$ of the aperture 102, as illustrated at 202 and 204 in FIG. 5. Further, the method 200 may comprise selecting a core drill 106 having a size, e.g., a cutting diameter, and a cutting surface 108, as shown at 206. Further, the method 200 may comprise, as depicted at 208 and 210, selecting an angle α at which to cut the component with the core drill 106 and selecting a cutting speed of the core drill 106. Likewise, as shown at 212, the method 200 may include cutting a back surface 110 of the component 100 with the core drill 106, and the cutting surface 108 of the core drill 106 may be positioned at the angle α. Finally, the method 200 may comprise cutting the aperture 102 through to its final dimension $d_f$ with the core drill 106. For instance, cutting the component 100 from the back surface 110 may only define the aperture 102 to a depth that is less than the thickness t of the component 100; as such, the core drill 106 may be used to drill, grind, or cut the component 100 at the location 104 on a front surface 112, which is opposite the back surface 110, to completely cut or define the aperture 102 through the component 100. It will be appreciated that each of the cutting diameter of the core drill 106, the angle α with respect to the back surface 110, and the cutting speed may be the ranges listed elsewhere herein. Further, as previously stated, it will be understood that the component 100 may have a geometry that requires the core drill 106 to be positioned at the angle α to cut the back surface 110, while the core drill 106 may be oriented normal to the front surface 112 to cut the aperture 102 through to its final dimension $d_f$. Moreover, a coolant C may be circulated adjacent the cutting surface 108 of the core drill 106 and/or a fluid F may be flowed into and out of the aperture 102, e.g., to flush the aperture 102, as previously described.

Accordingly, the present subject matter provides methods and apparatus for forming holes or apertures in components, particularly CMC components. More specifically, the present subject matter provides methods for forming apertures in a CMC component that include cutting the CMC component with the cutting tool positioned at an angle and cutting the CMC component first on one surface of the component and completing the cut from an opposite surface of the component. Such angled cutting, grinding, or machining from one side followed by finishing the cut from an opposite side may help reduce defects, such as chipping, cracking, or other types of material breakage, that typically stem from cutting the CMC material. Stated differently, scoring the back surface of a CMC component on an angle may help reduce defects and/or non-conforming components that may occur through cutting of the CMC material. In one comparison, traditional straight-through or non-angled drilling or cutting had a first time yield of approximately 50%, while cutting or drilling using the methods described herein had a first time yield of approximately 85%. Other improvements in acceptable component yield also may be realized. Further, the methods and apparatus described herein have other features for reducing defects and increasing part or component yield upon machining. As described herein, methods for forming apertures in a CMC component may include selecting a cutting tool size that is smaller than the final or finished dimension of an aperture. The smaller size tool may then be used to start the aperture from one side of the component and finish the aperture from an opposite side of the component. The smaller tool size, along with scoring the component on one side before finishing on an opposite side, may help reduce component defects and increase yield of acceptable components. Other advantages and benefits also may be realized from these and/or other aspects of the present subject matter.

Further aspects of the invention are provided by the subject matter of the following clauses:

1. A method for forming an aperture in a ceramic matrix composite (CMC) component, the method comprising based on a final dimension of the aperture, selecting a tool having a tool size and a cutting surface; selecting an angle at which to cut the component with the tool; cutting a back surface of the component with the tool, the cutting surface of the tool positioned at the angle; repositioning the tool relative to the component; and cutting the aperture through to its final dimension.

2. The method of any preceding clause, wherein cutting the aperture through to its final dimension comprises cutting the component from a front surface, the front surface opposite the back surface.

3. The method of any preceding clause, wherein cutting the component from the front surface comprises cutting the component with the cutting surface of the tool positioned normal to the front surface.

4. The method of any preceding clause, wherein cutting the back surface of the component comprises cutting the back surface at a pre-determined location of the aperture to a depth that is less than a thickness of the component at the pre-determined location of the aperture.

5. The method of any preceding clause, wherein the tool is selected to have a tool size within a range of 60% to 90% of the final dimension of the aperture.

6. The method of any preceding clause, wherein the tool is selected to have a tool size within a range of 65% to 80% of the final dimension of the aperture.

7. The method of any preceding clause, wherein the angle is selected to be within a range of 5° to 80° with respect to the back surface of the component.

8. The method of any preceding clause, wherein the angle is selected to be within a range of 10° to 60° with respect to the back surface of the component.

9. The method of any preceding clause, further comprising flushing the aperture with a fluid while cutting the back surface of the component.

10. The method of any preceding clause, further comprising selecting a cutting speed for cutting the back surface of the component, wherein the cutting speed is within a range of 400 surface feet per minute (SFM) to 1500 SFM.

11. The method of any preceding clause, wherein the cutting speed is within a range of 900 SFM to 1100 SFM.

12. The method of any preceding clause, wherein the tool is a core drill and the tool size is the diameter of the cutting surface.

13. The method of any preceding clause, further comprising circulating a coolant along a flow path within the core drill, wherein at least a portion of the flow path is adjacent the cutting surface.

14. The method of any preceding clause, wherein the tool is selected to have a diameter of the cutting surface that is within a range of 60% to 90% of the final dimension of the aperture, and wherein the angle is selected to be within a range of 10° to 60° with respect to the back surface.

15. The method of any preceding clause, wherein the component has a geometry that requires the core drill to be positioned at the angle to cut the back surface.

16. The method of any preceding clause, wherein cutting the back surface of the component comprises cutting the back surface at a pre-determined location of the aperture to a depth that is less than a thickness of the component at the pre-determined location of the aperture, and wherein cutting the aperture through to its final dimension comprises cutting the component from a front surface that is opposite the back surface.

17. A method for forming an aperture in a ceramic matrix composite (CMC) component, the aperture extending through the component between a front surface and an opposing back surface at a pre-determined location and a pre-determined final dimension, the method comprising selecting a tool having a tool size and a cutting surface; selecting an angle less than 90° at which to cut the back surface of the component with the tool, wherein the component has a geometry that prevents the tool from being aligned at a 90° angle to the back surface; cutting the back surface of the component with the tool to a depth less than a thickness of the component at the pre-determined location of the aperture, the cutting surface of the tool positioned at the angle; and cutting the aperture through to the pre-determined final dimension from the front surface.

18. The method of any preceding clause, wherein the tool is selected to have a tool size within a range of 60% to 90% of the final dimension of the aperture, and wherein the angle is selected to be within a range of 5° to 80° with respect to the back surface of the component.

19. The method of any preceding clause, wherein cutting the back surface is at a first cutting speed and cutting from the front surface is at a second cutting speed different than the first cutting speed.

20. A method for forming an aperture in a ceramic matrix composite (CMC) component, the method comprising based on a final dimension of the aperture, selecting a core drill having a cutting diameter and a cutting surface; selecting an angle at which to cut the component with the core drill; cutting a back surface of the component with the core drill, the cutting surface of the core drill positioned at the angle; and cutting the aperture through to its final dimension from a front surface of the component, the front surface opposite the back surface, the cutting surface of the core drill positioned normal to the front surface.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for forming an aperture in a ceramic matrix composite (CMC) component, the method comprising:
    based on a final dimension of the aperture, selecting a tool having a tool size and a cutting surface;
    selecting a non-normal angle at which to cut the CMC component with the tool;
    cutting a back surface of the CMC component with the tool, the cutting surface of the tool positioned at the non-normal angle;
    repositioning the tool relative to the CMC component; and
    cutting the aperture through to its final dimension from a front surface, the front surface opposite the back surface,
    wherein the tool is selected to have a tool size within a range of 60% to 90% of the final dimension of the aperture,
    wherein cutting the CMC component from the front surface comprises cutting the CMC component with the cutting surface of the tool positioned normal to the front surface, and
    wherein each of the back surface and the front surface are planar surfaces of the CMC component.

2. The method of claim 1, wherein cutting the back surface of the CMC component comprises cutting the back surface at a pre-determined location of the aperture to a depth that is less than a thickness of the CMC component at the pre-determined location of the aperture.

3. The method of claim 1, wherein the tool is selected to have a tool size within a range of 65% to 80% of the final dimension of the aperture.

4. The method of claim 1, wherein the non-normal angle is selected to be within a range of 5° to 80° with respect to the back surface of the CMC component.

5. The method of claim 4, wherein the non-normal angle is selected to be within a range of 10° to 60° with respect to the back surface of the CMC component.

6. The method of claim 1, further comprising:
    flushing the aperture with a fluid while cutting the back surface of the CMC component.

7. The method of claim 1, further comprising:
    selecting a cutting speed for cutting the back surface of the CMC component,
    wherein the cutting speed is within a range of 400 surface feet per minute (SFM) to 1500 SFM.

8. The method of claim 7, wherein the cutting speed is within a range of 900 SFM to 1100 SFM.

9. The method of claim 1, wherein the tool is a core drill, and wherein the non-normal angle is selected to be within a range of 10° to 60° with respect to the back surface.

10. The method of claim 9, further comprising:
    circulating a coolant along a flow path within the core drill,
    wherein at least a portion of the flow path is adjacent the cutting surface.

11. The method of claim 9, wherein the CMC component has a geometry that requires the core drill to be positioned at the non-normal angle to cut the back surface.

12. The method of claim 1, wherein the tool is a first tool, wherein cutting the aperture through to its final dimension from the front surface comprises cutting the aperture with a second tool, wherein the first tool has a first diameter and the second tool has a second diameter, the first diameter different from the second diameter.

13. The method of claim 12, wherein cutting the back surface of the CMC component with the first tool comprises operating the first tool at a first cutting speed, wherein cutting the aperture through to its final dimension from the front surface with the second tool comprises operating the second tool at a second cutting speed, and wherein the first cutting speed is different from the second cutting speed.

14. The method of claim 13, wherein the first diameter is smaller than the second diameter, and wherein the first cutting speed is faster than the second cutting speed.

15. A method for forming an aperture in a ceramic matrix composite (CMC) component, the aperture extending through the CMC component between a front surface and an opposing back surface at a pre-determined location and a pre-determined final dimension, the method comprising:
    selecting a tool having a tool size and a cutting surface;
    selecting an angle less than 90° at which to cut the back surface of the CMC component with the tool, wherein the CMC component has a geometry that prevents the tool from being aligned at a 90° angle to the back surface;
    cutting the back surface of the CMC component with the tool to a depth less than a thickness of the CMC component at the pre-determined location of the aperture, the cutting surface of the tool positioned at the angle, wherein the depth is constrained by a tangency of the angle of the tool to the CMC component; and
    cutting the front surface of the CMC component with the tool to cut the aperture through to the pre-determined final dimension,
    wherein the tool is selected to have a tool size within a range of 60% to 90% of the pre-determined final dimension of the aperture.

16. The method of claim 15, wherein the angle is selected to be within a range of 5° to 80° with respect to the back surface of the CMC component.

17. The method of claim 15, wherein cutting the back surface is at a first cutting speed and cutting the front surface is at a second cutting speed different than the first cutting speed.

18. A method for forming an aperture in a ceramic matrix composite (CMC) component, the method comprising:
based on a final dimension of the aperture, selecting a core drill having a cutting diameter and a cutting surface;
selecting an angle at which to cut the CMC component with the core drill;
cutting a back surface of the CMC component with the core drill, the cutting surface of the core drill positioned at the angle; and
cutting the aperture through to its final dimension from a front surface of the CMC component with a second tool, the front surface opposite the back surface, the cutting surface of the second tool positioned normal to the front surface,
wherein the core drill has a first diameter and the second tool has a second diameter, the second diameter different from the first diameter.

19. The method of claim 18, wherein cutting the back surface of the CMC component with the core drill comprises operating the core drill at a first cutting speed, wherein cutting the aperture through to its final dimension from the front surface of the CMC component with the second tool comprises operating the second tool at a second cutting speed, and wherein the first cutting speed is different from the second cutting speed.

* * * * *